June 10, 1958  H. ERDMANN  2,837,812
MEANS FOR DISPENSING AND APPLYING OPEN RETAINING RINGS
Filed Dec. 22, 1953  11 Sheets-Sheet 1
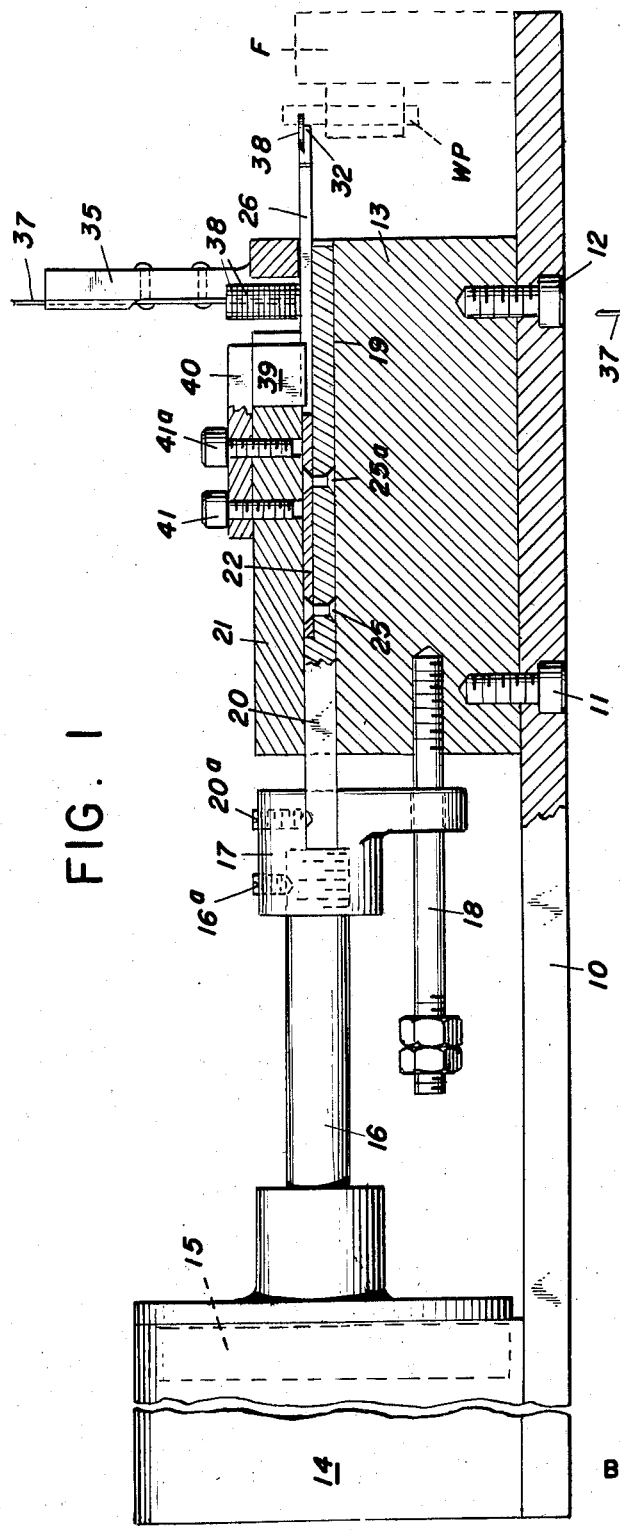
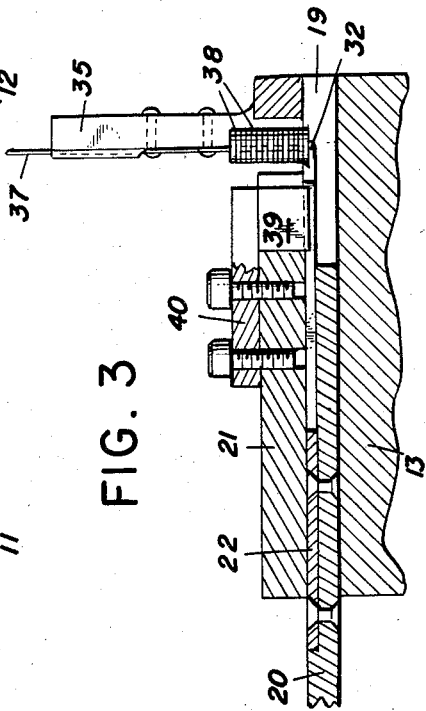
INVENTOR
HANS ERDMANN
BY
ATTORNEY June 10, 1958 H. ERDMANN 2,837,812
MEANS FOR DISPENSING AND APPLYING OPEN RETAINING RINGS
Filed Dec. 22, 1953 11 Sheets-Sheet 2

INVENTOR
HANS ERDMANN

BY
ATTORNEY

June 10, 1958     H. ERDMANN     2,837,812
MEANS FOR DISPENSING AND APPLYING OPEN RETAINING RINGS
Filed Dec. 22, 1953     11 Sheets-Sheet 3
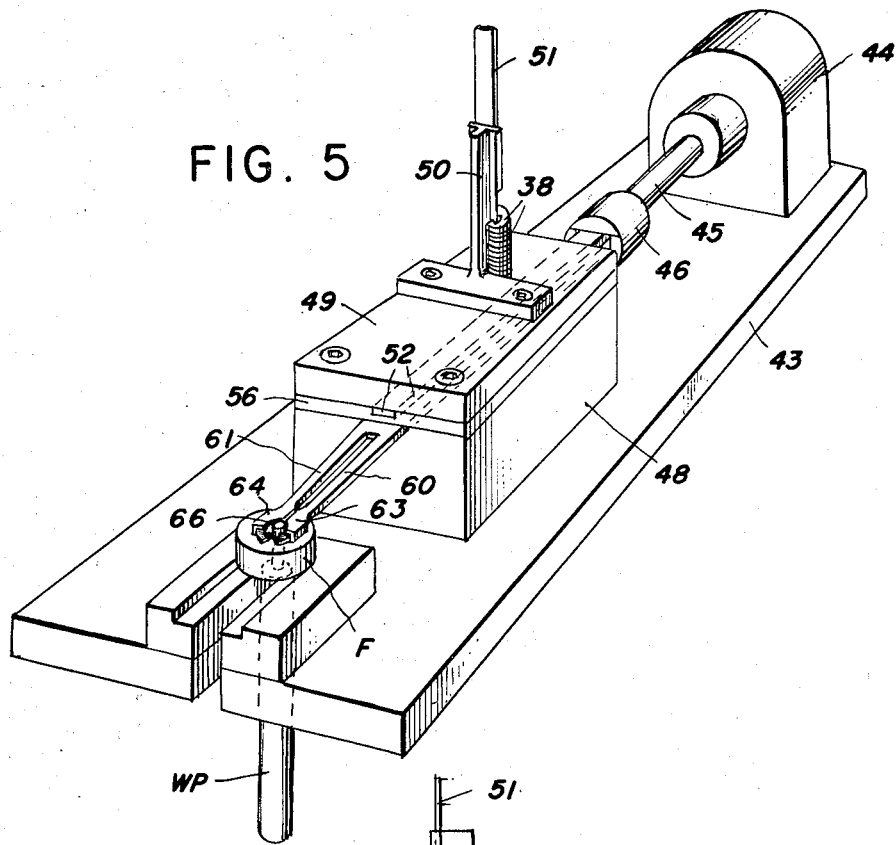
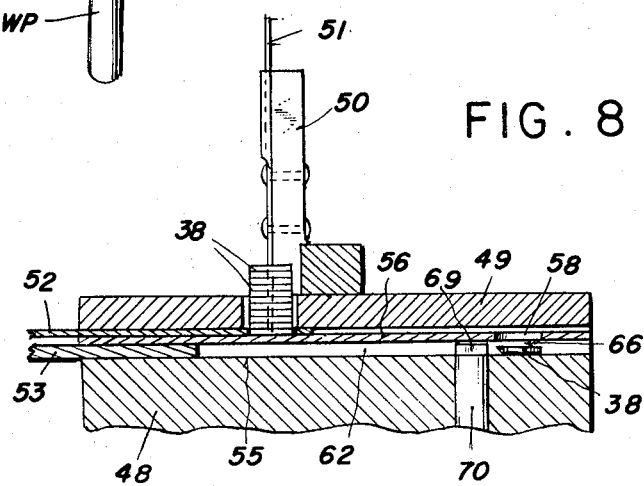
INVENTOR
HANS ERDMANN
BY
ATTORNEY June 10, 1958     H. ERDMANN     2,837,812
MEANS FOR DISPENSING AND APPLYING OPEN RETAINING RINGS
Filed Dec. 22, 1953     11 Sheets-Sheet 4

INVENTOR
HANS ERDMANN

BY
ATTORNEY

INVENTOR
HANS ERDMANN
ATTORNEY

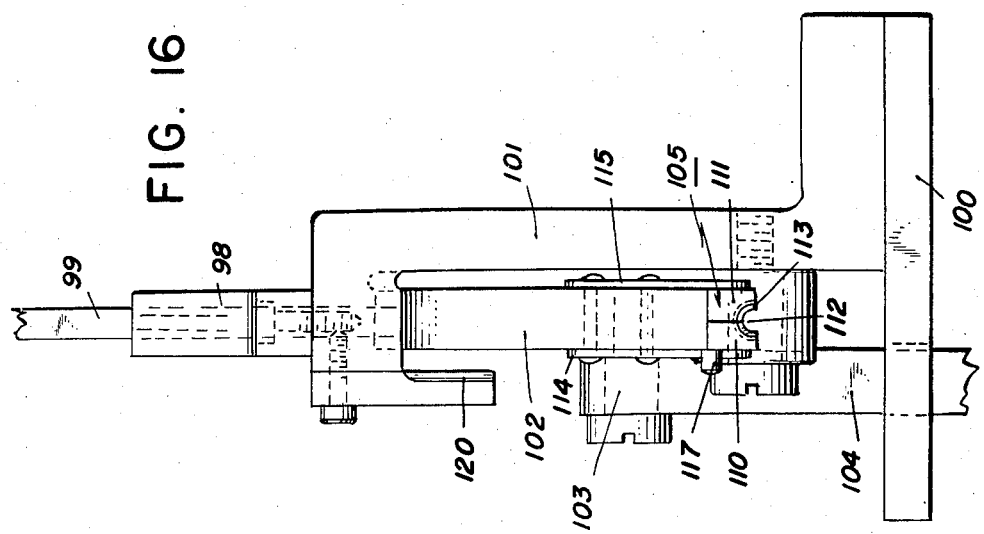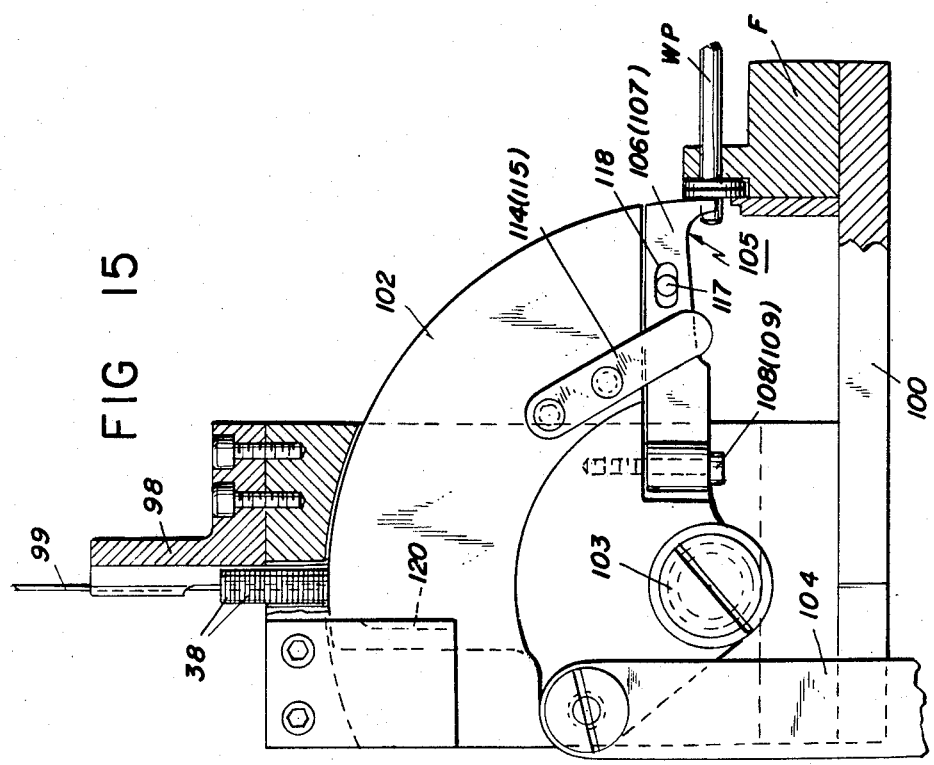

June 10, 1958     H. ERDMANN     2,837,812
MEANS FOR DISPENSING AND APPLYING OPEN RETAINING RINGS
Filed Dec. 22, 1953     11 Sheets-Sheet 9

INVENTOR
HANS ERDMANN
BY
ATTORNEY

June 10, 1958     H. ERDMANN     2,837,812
MEANS FOR DISPENSING AND APPLYING OPEN RETAINING RINGS
Filed Dec. 22, 1953     11 Sheets-Sheet 11

INVENTOR
HANS ERDMANN

BY *J Harold Kilcoyne*
ATTORNEY

United States Patent Office 2,837,812
Patented June 10, 1958

2,837,812

MEANS FOR DISPENSING AND APPLYING OPEN RETAINING RINGS

Hans Erdmann, Maplewood, N. J., assignor to Waldes Kohinoor, Inc., Long Island City, N. Y., a corporation of New York Application December 22, 1953, Serial No. 399,795

18 Claims. (Cl. 29—211)

This invention relates to improvements in means for dispensing and applying open retaining rings, and more particularly to a means for dispensing single retaining rings from a stack thereof and for transferring and applying the rings to work pieces positioned to receive them, in fully automatic manner.

In my earlier applications Serial No. 298,869, filed July 14, 1952, and Serial Nos. 371,359, now Patent No. 2,712,398 and 371,360, now Patent No. 2,735,581, filed July 29, 1953, I have disclosed various forms of retaining ring dispensers of the type adapted to effect manual dispensing of open rings arranged in a vertical stack or column on a so-called stack rod through the use of a manually operated applicator tool designed, when co-operated with the dispenser, to grip and withdraw the lowermost ring of the stack, the applicator being thereafter employed by the operator to transfer the gripped ring and apply it to a work piece. Speaking generally, my prior dispensers were of two types, one being adapted to be operated by an applicator tool held with its ring backing flange disposed to back or support the gripped ring from beneath, and the other by an applicator turned 180° so that its backing flange is disposed upwardly, thereby to present the ring to the work piece with its upper face backed by said flange.

The need for utmost speed in dispensing and applying retaining rings according to present mass production methods makes it highly desirable to mechanize such operations, not only to speed up the application of retaining rings to their work pieces, but also to relieve the workmen of the manual operations heretofore involved in applying the rings. Accordingly, it is a main object of the present invention to provide a mechanized means for dispensing single retaining rings from a source of supply thereof, i. e. a plurality of such rings arranged in a vertical stack or column, and for transferring and applying them to work pieces positioned to receive the rings, at an exceedingly fast rate.

A further object of the invention is the provision of a retaining ring dispensing and applying means as aforesaid which is fully automatic in its operation, thus doing away with the manual operations heretofore required in applying such retaining rings.

A further object of the invention is the provision of a high speed and fully automatic means for dispensing single retaining rings from a stack or column thereof and for transferring and applying them to work pieces positioned to receive the same, which is thoroughly effective and dependable in its operation.

A further object of the invention is the provision of fast and completely automatic means for gripping and withdrawing the lowermost retaining ring of a stack of such rings and for applying said ring to a work piece as by forcing it into the groove provided for its reception in the work piece.

Yet another object of the invention is the provision of means for automatically dispensing and applying open retaining rings to a shaft, pin or the like positioned to receive same, which incorporates an applicator for gripping the lowermost ring of a stack of the rings and for transferring and applying same to the work piece, in which provision is made for the applicator being positioned with its backing flange disposed below the ring gripped thereby so as to support it from beneath.

A still further object of the invention is the provision of means for automatically dispensing and applying open retaining rings to a shaft, pin or the like positioned to receive same, which incorporates an applicator for gripping the lowermost ring of a stack of the rings and for transferring and applying same to the work piece, in which provision is made for the applicator being positioned with its ring backing flange disposed above the ring gripped thereby so as to back the ring from above.

Other objects and advantages of retaining ring dispensing and applying means according to the invention will appear from the following detailed description, taken with the accompanying drawings illustrating various physical embodiments thereof, in which—

Fig. 1 is a side elevation, partly in section, of one form of retaining ring dispensing and applying means of the invention, in which the applicator is shown in its most advanced or ring-applying position;

Figs. 3 and 4 are partial views corresponding generally to Figs. 1 and 2, respectively, but showing the applicator in retracted position in which its jaws are spread to receive the lowermost retaining ring of the vertical stack or column thereof;

Fig. 5 is a perspective view illustrating another form of retaining ring dispensing and applying means according to the invention, characterized by an applicator having its ring backing flange upwardly disposed so as to back a ring gripped thereby from above;

Figs. 8 and 9 are partial views corresponding generally to Figs. 6 and 7, respectively, but illustrating the applicator in its retracted position;

Fig. 15 is a part-sectional view generally similar to Fig. 14, but with the applicator shown in its most advanced or ring-applying position;

Figs. 16, 17 and 18 are front, top and bottom views, respectively, of the Fig. 14 form of ring dispensing and applying means, with the applicator in its ring-applying position, as in Fig. 15;

Figs. 20 and 21 are broken away plan views of the form of the invention illustrated in Fig. 19, of which Fig 21 illustrates the means for indexing the turret so as to present the applicators successively to their functional positions; and Fig. 22 is a front view of Fig. 20.

Figure 2:
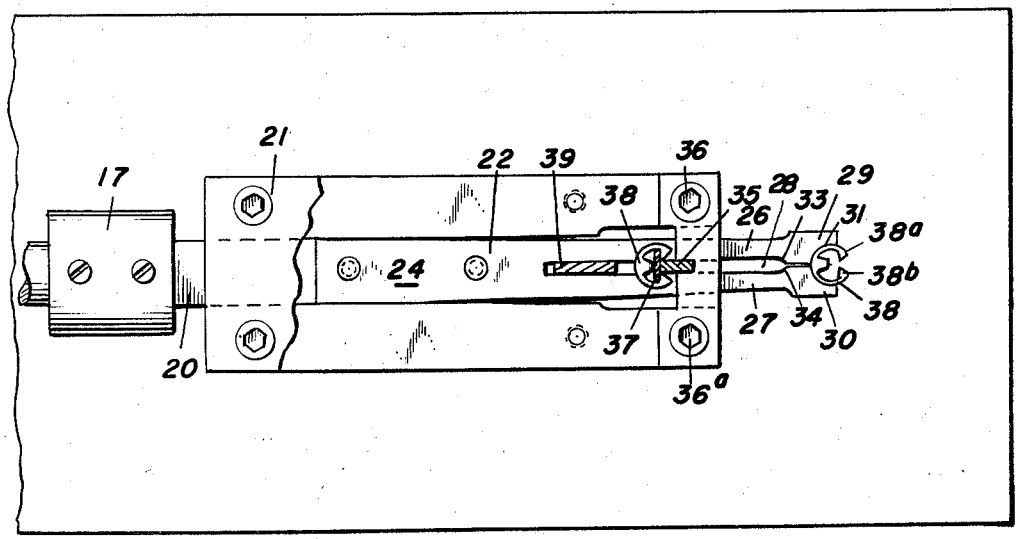
Fig. 2 is a partial plan view of the apparatus shown in Fig. 1, with the slideway-cover plate broken away.

Referring to the drawings, and first considering the embodiment shown in Figs. 1–4 thereof, reference numeral 10 (Fig. 1) designates the base of the apparatus, to which is rigidly affixed, as by set screws 11, 12, an upstanding block 13. The base also carries a power source illustratively shown to be an air cylinder 14 (but which could be a hydraulic cylinder or a solenoid for example) whose piston 15 carries a piston rod 16 affixed at its outer (forward) end as by a set screw 16a to a connector head 17 which has sliding bearing on a guide post 18 threaded into the rear face of the block 13 and serving to guide the piston rod throughout its reciprocatory travel. A longitudinal slideway 19 is cut or otherwise formed in the upper face of the block 13, and mounted to slide therein is a slide member 20 connected at its rearward end to the head 17 as by a set screw 20a. The slideway is covered by a cover plate 21 whose forward end terminates a substantial distance rearwardly of the front face of the block 13. Being connected to the piston rod 16, the slide 20 is adapted to be reciprocated in the slideway 19 in accordance with movement of piston 15.

By reference to Figs. 1 and 2, the upper face of the slide 20 is recessed to receive the elongated shank of an applicator tool 22 (hereinafter for convenience referred to as an applicator). Said applicator, which with exceptions to be noted is preferably of the general type disclosed in the patent to Brell, No. 2,483,379, dated September 29, 1949, comprises the aforesaid shank 24 which is connected to slide 20 as by rivets 25, 25a, from which extend arms 26, 27 spaced by a slot 28, the arms terminating in segmental jaws 29, 30 together defining a ring-receiving recess 31 whose arcuate edge extends along an arc of approximately 180°. As explained in the aforesaid Brell patent, the jaws 29, 30 are spreadable under tension, the recess edge is preferably undercut to provide a seat for a retaining ring received therein, and the jaws 29, 30 are extended radially inwardly with respect to the seat so as to provide a backing flange 32 for a ring received in the recess. In the embodiment under description, the applicator is disposed with its ring-backing flange 32 disposed below the ring recess 31, thus to back a ring received in the recess from below.

Figure 4:
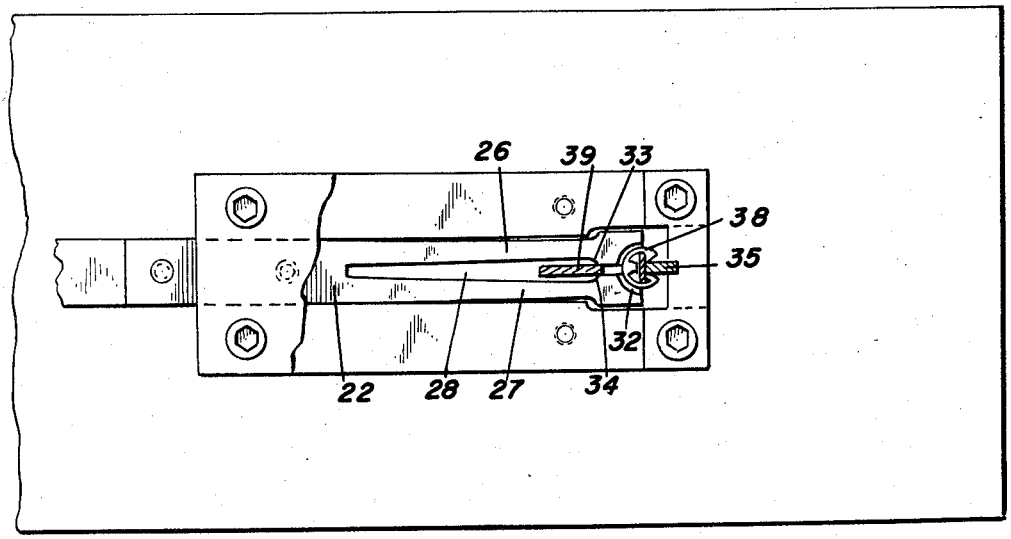

As best seen in Figs. 2 and 4, the slot 28 spacing the applicator arms 26, 27 is narrowed as said arms merge into the jaws 29, 30, preferably through the provision of converging slot edge portions 33, 34 which act as cam surfaces for the purpose to be explained.

An upright stack rod holder 35 (Figs. 1 and 2) is secured to the upper face of the block 13 adjacent its forward edge as by bolts 36, 36a and mounts a vertical stack rod 37 on which are stacked a plurality of open retaining rings 38, preferably E rings of the type disclosed and claimed in United States Patent No. 2,411,761, dated November 26, 1946, the ring stack normally resting on the upper surface of the applicator. It will be understood that the lower edge of the stack rod 37 terminates just above the line of the upper face of the applicator, so that the latter may partake of its reciprocating movement without interference by the stack rod. Said stack rod preferably has width such as positively to hold the stack of retaining rings 38 disposed thereon in vertical stack formation, as by engaging behind the end lugs 38a, 38b with which E rings are conventionally provided. As will be seen from Figs. 2 and 4, the rings 38 are arranged on the stack rod 37 so that the gap between their open ends face forwardly, thus to correspond to the facing of the ring recess provided in the applicator 22.

According to one feature of the invention, the applicator jaws 29, 30 are positively spread when positioned below the stack, thus to facilitate the lowermost ring of the stack thereof dropping in the applicator recess 31, and are thereupon released so as to grip the ring received in said recess. To this end, there is provided a rib or blade 39 illustratively shown to be carried by a plate 40 secured to the upper face of the cover plate 21 as by screws 41, 41a, and which depends downwardly therefrom and projects into the slot 28 between the applicator arms 26, 27. The width of the blade 39 is greater than that of the forward narrowed end of the slot, and it is positioned in relation to the travel of the applicator as to engage against the converging edge portions 33, 34 of the slot when the applicator is at the end of its rearward stroke and about to begin its forward stroke, in which position the applicator recess 31 directly underlies the ring stack. When the blade engages said converging (cam) surfaces, it effects limited spreading of the applicator jaws 29, 30, as seen in Fig. 4, with the result that the lowermost ring is free to drop into the applicator recess to a position on which it rests on the backing flange 32 thereof.

From the above, it will be seen that when the slide 20 and applicator 22 are at the end of their rearward stroke, the lowermost ring of the stack thereof on rod 37 (which previously had been supported on the upper face of the applicator) drops into the ring recess wherein it rests on the backing flange 32 of the applicator. Upon the forward movement of the slide being initiated, the blade 39 immediately withdraws from engagement with the converging slot edge portions 33, 34, whereupon the jaws close on and positively grip said lowermost ring. Continued movement of the slide and applicator through their forward stroke projects the ring forwardly and, upon reaching the end of its forward stroke, the applicator applies the ring to a work piece WP secured in position to receive the same in a fixture F mounted on the forward end of the base 10, as schematically shown in Fig. 1. As the slide and applicator begin their rearward stroke, the applicator withdraws from the ring now applied to the work piece, because the ring is designed to grip said workpiece with a force greater than the force applied to the ring by the applicator jaws 29, 30. During continued retracting movement of the applicator, the stack of rings is supported on the upper face thereof and, upon the applicator reaching the end of its rearward stroke, its jaws 29, 30 are again opened, as above, thus enabling the now lowermost ring of the stack thereof to lower into the ring recess 31, and conditioning the apparatus for the next ring dispensing and applying cycle.

Figure 6:
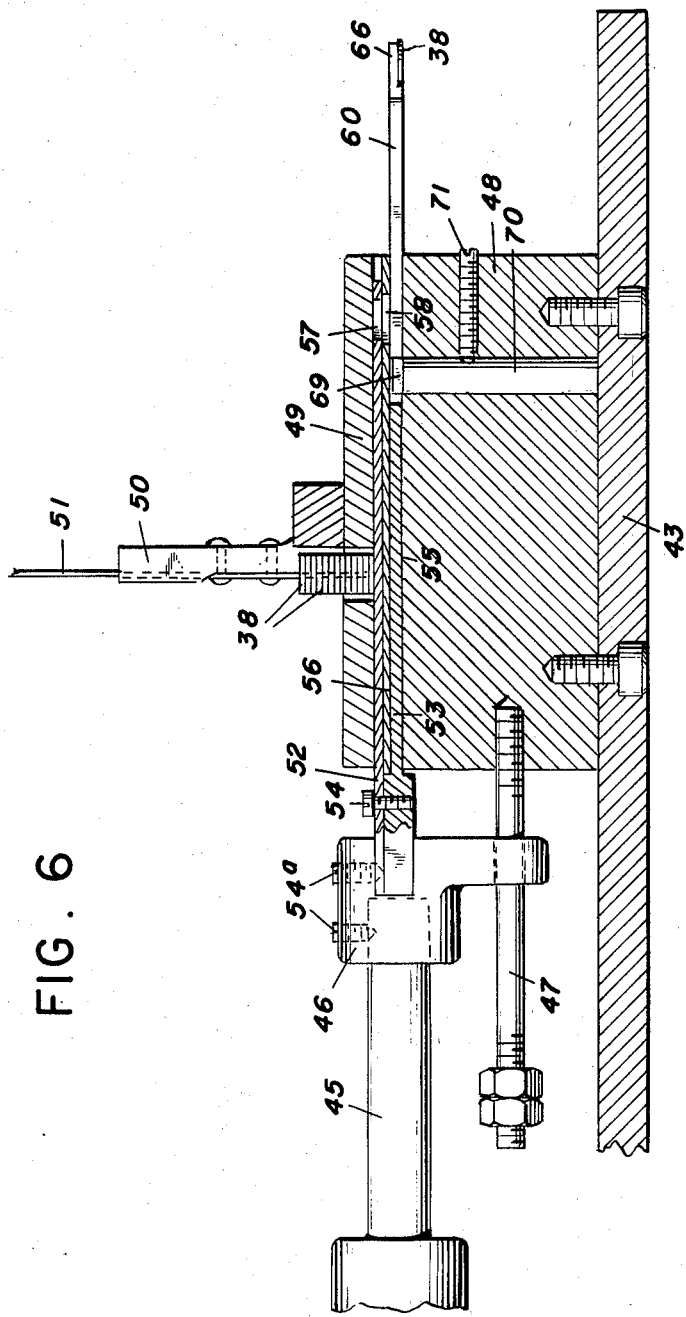
Figs. 6 and 7 are broken away elevational (partly in section) and plan views, respectively, of the apparatus shown in Fig. 5, with the applicator illustrated in its most advanced or ring-applying position.
Figure 7:
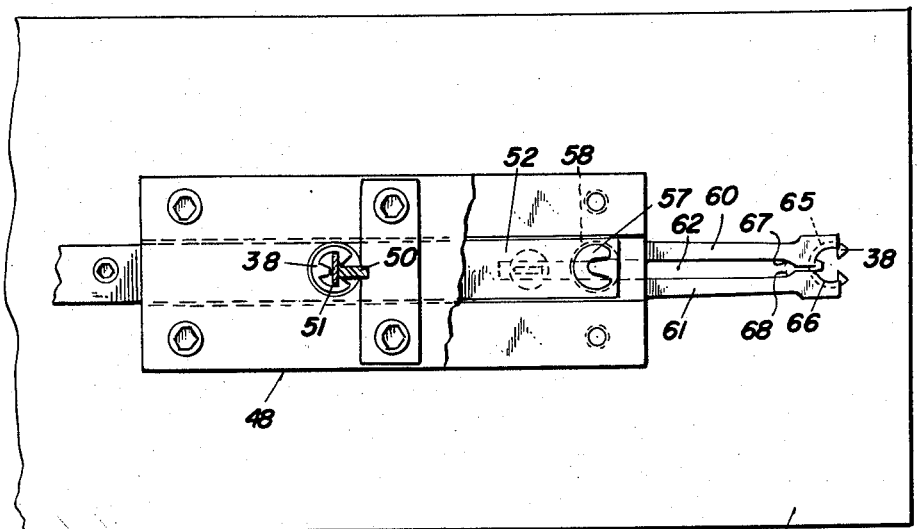
Figure 9:
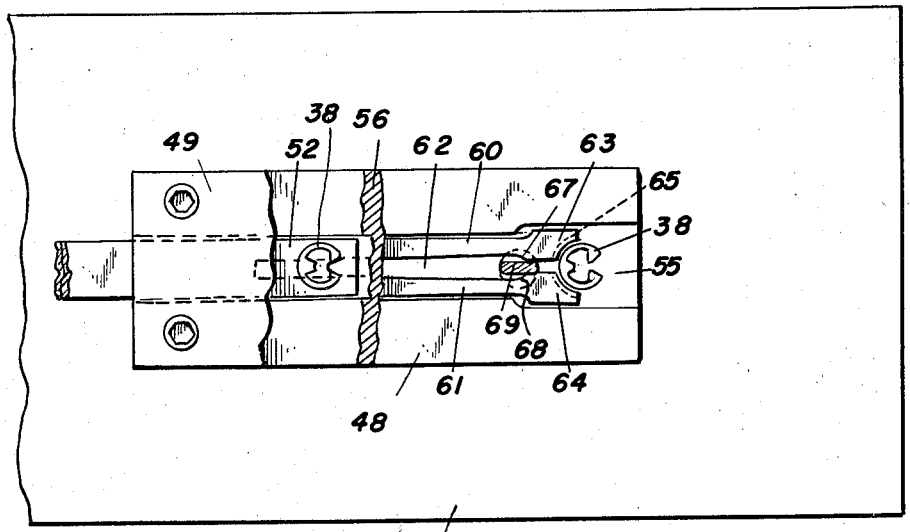

While operating on substantially the same principle as just described, the form of retaining ring dispensing and applying means illustrated in Figs. 5–9 is designed for an applicator positioned with its backing flange disposed to overlie (back from above) a retaining ring received in its recess, and accordingly provision is made for movement of the applicator in its slideway without said backing flange engaging or disturbing the rings or rings of the stack disposed immediately above the lowermost ring. To this end, the modified apparatus, which incorporates a base 43 mounting a power source 44 (an air or hydraulic cylinder or a solenoid) driving a piston rod 45 affixed to a head 46 sliding on a guide rod 47, and a block 48 and its cover plate 49 carrying a stack rod holder 50 and stack rod 51, all as previously described, employs a different arrangement of slide and applicator, which will now be described. As best seen in Fig. 6, the slide 52 is disposed above the applicator 53 and said parts are connected to one another at their rearward ends as by a connecting screw 54 and to the head 46 as by a set screw 54a for reciprocatory travel in a slideway 55 provided in the upper surface of the block 48. Moreover, the thickness of the slide 52 corresponds to the axial thickness of one ring 38, and the slide is spaced from the upper face of the applicator throughout the forward portion of its length to accommodate a fixed plate 56 sandwiched in between said parts, the fixed plate preferably also having a thickness corresponding to that of a single ring.

As also seen in Fig. 6, the slide 52 adjacent its forward end is provided with an opening 57, and the fixed plate 58 adjacent its forward end is similarly provided with an opening 58, said openings having slightly larger diameter than that of a ring 38. The positioning of said openings 57 and 58 with respect to one another is such that they are in vertical registry when the slide and applicator are at the end of their forward stroke, and the positioning of the stack rod with respect to slide and applicator travel is such that when the slide is at the end of its rearward stroke and about to begin its forward stroke, slide opening 57 directly underlies the stack of rings, which latter is normally supported on the top surface of the slide. Thus, it will be seen that as the slide and applicator move throughout their forward stroke, the lowermost ring dropping into slide opening 57 and resting on the fixed plate 56 is pushed forwardly by the slide until the openings 56 and 57 are in registry, whereupon the ring drops from opening 57 into the fixed plate opening 58.

The ring gripping and applying end of the applicator 53 is the same as previously described, and comprises forwardly extending arms 60, 61 spaced by a slot 62, the arms merging into segmental jaws 63, 64 defining a ring seating recess 65 and a backing flange 66 extending inwardly from the recess edge, said flange according to the present form facing upwardly thus to back a ring received in said recess 65 from above. Also, as previously described, the slot 62 is narrowed by means of converging edge portions 67, 68 adapted to be engaged by a blade or rib 69 projecting into the slot as with the Figs. 1–9 form. However, rather than depending into the slot from above, as such would require slotting both of slide 52 and fixed plate 56, the blade 69 projects into the slot from below, being formed at the upper end of a pin 70 seating in a vertical bore provided in the block 48 and secured in fixed position therein by means of a set screw 71. The positioning of the blade 69 is such that it engages the converging slot edge portions 67, 68 upon the slide 52 and applicator 53 being at the end of their rearward stroke and about to begin their forward stroke. Such engagement results in the applicator jaws 63, 64 being spread the amount required to enable the ring previously deposited in the fixed plate opening 58 by the preceding forward stroke of the slide to drop through the applicator onto the upper surface of the slideway 55, in position to be received in the applicator recess 65 and to be gripped by the applicator jaws 63, 64 upon the inclined slot edge portions 67, 68 moving away from the spreading blade 69 consequent to forward movement of the applicator being initiated.

Thus, it will be seen that just prior to each forward stroke of the slide 52 and applicator 53 being initiated, a ring previously advanced from the stack thereof to the fixed plate opening 58 drops therefrom through the now spread backing flange 66 onto the slideway, in position to be gripped by the applicator jaws upon closing thereof, and simultaneously therewith the now lowermost ring of the stack drops into the slide opening 57. As the forward stroke commences, the applicator jaws close on and grip the ring resting on the slideway, with continued movement of applicator projecting the ring and applying it to a work piece WP, such as a spindle positioned in a fixture F carried by the base 43. Also, as the slide partakes of its forward stroke, it advances the ring received in its opening 57 to the fixed plate opening 58, thus conditioning the apparatus for the next ring dispensing and applying cycle.

Figure 10:
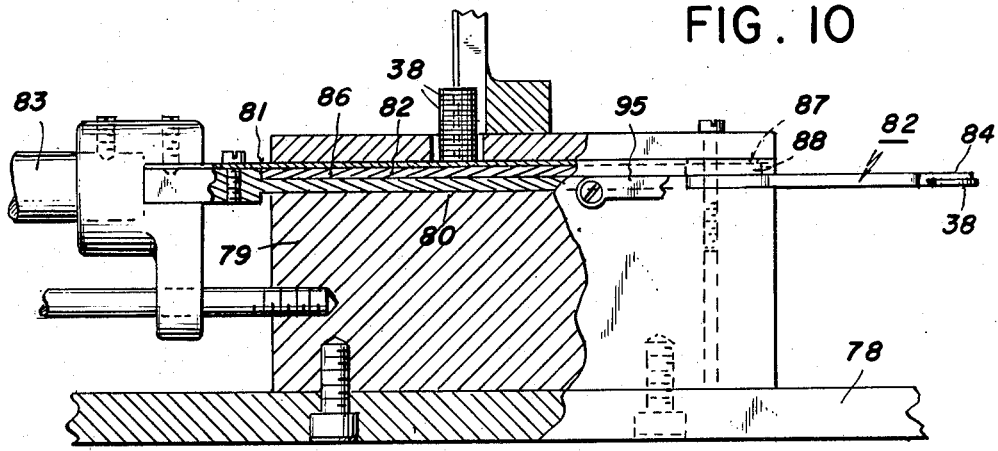
Fig. 10 is a broken-away side elevation, partly in section, of yet another form of retaining ring dispensing and applying means of the invention also incorporating an applicator positioned with its backing flange disposed above the ring recess thereof, thereby to back a ring gripped by the applicator from above, the view illustrating the applicator in its most advanced or ring-applying position.

Referring to Figs. 10–13, such illustrate yet another embodiment of retaining ring dispensing and applying means according to the invention which employs somewhat different means from that described above for effecting spreading of the applicator jaws over a ring presented to its ring recess. Referring to Fig. 10, the modified construction employs a base 78 mounting a block 79 provided in its upper face with a slideway 80, in which a slide 81 and an applicator 82, generally as disclosed in Figs. 6–9, is arranged for reciprocatory travel, being powered in said movement through a piston rod 83 driven from a power source corresponding to the previously described power source 44, for example. As with the applicator 53 of Figs. 6–9 form, the applicator 82 is arranged with its ring backing flange 84 disposed upwardly, so as to back a ring received in its recess 85 from above, said recess being defined by the segmental jaws 85a, 85b, as previously described. Accordingly, the modified structure is provided with a fixed plate 86 sandwiched between the slide 81 and the shank portion of the applicator, and the slide 81 and fixed plate 86 are provided with openings 87 and 88, respectively, all arranged and functioning similarly to the fixed plate 56 and the slide and fixed plate openings 57, 58 of the Figs. 6–9 form.

Figure 11:
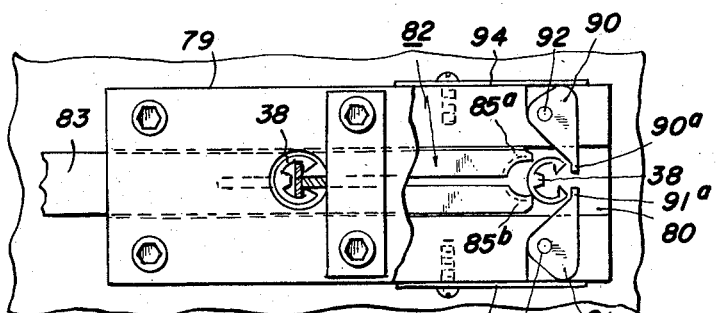
Figs. 11, 12 and 13 are partial plan views, with the slideway-cover plate cut away, showing different positions of the applicator of the Fig. 10 form of the invention.
Figure 12:
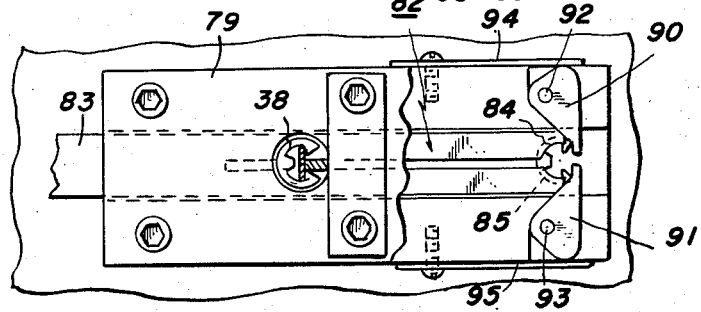
Figure 13:
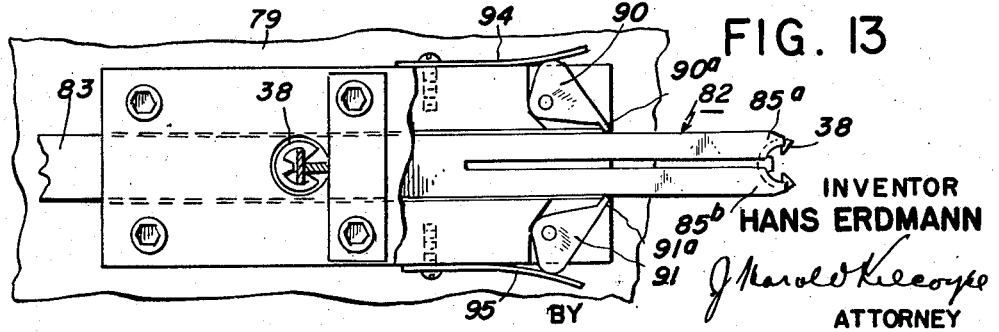

However, as will be observed from Figs. 11–13, the blade and cam slot means for spreading the applicator jaws characterizing both the Figs. 1–5 and the Figs. 6–9 forms are eliminated, and in their place are provided oppositely arranged dogs 90, 91 mounted to swing on vertically disposed pivots 92, 93, and being normally maintained in a slideway obstructing position by means of leaf springs 94, 95 secured to the sides of the block 79 and whose free ends bear against the outer edges of the dogs which are suitably curved for spring engagement therewith. The dogs 90, 91 terminate at their free ends in noses 90a, 91a which reach towards one another across the slideway 80. As best seen in Fig. 11, the normal position of the dogs lengthwise of the slideway is such that their noses 90a, 91a are positioned just forwardly of a ring dropping through the fixed plate opening 88 on to the slideway. By design, the force applied to the dogs 90, 91 by their springs 94, 95 is greater than that required to spread the applicator jaws 85a, 85b when the latter are pressed against a ring barred from advance movement by the dogs 90, 91 functioning as a rigid abutment, and less than the force which is applied to the applicator by the power source. Thus, following seating of a ring in the applicator recess 85, continued forward movement of the applicator and ring effects opposite swinging movement of the dogs out of the path of the applicator.

Briefly summarizing the operation of the Figs. 10–13 form, movement of slide and applicator throughout their forward stroke results in the lowermost ring 38 of the stack thereof, which has dropped into slide opening 87, being advanced to a position in which it drops into the fixed plate opening 88, and in the ring which has been previously deposited in said opening 88 and has dropped to the slideway 80 being gripped by the applicator and advanced to the work piece, as with the Figs. 6–9 form. However, spreading of the applicator jaws about the ring positioned on the slideway 80 is effected by the applicator first pressing said ring against the adjacent noses of the dogs 90, 91 which act as a temporary ring abutment, with continued movement of the applicator against the temporarily fixed ring causing its jaws to spread over and firmly grip the ring in its ring recess 84. Further continued movement of the applicator and gripped ring results, as explained above, in the dogs swinging outwardly to a position shown in Fig. 13 and completion of the movement of the applicator throughout its forward stroke. Upon the applicator applying the ring to the work piece, it is actuated throughout its rearward stroke, whereupon the dogs 90, 91 return to their normal or ring-stop position as described.

In all of the prior described forms of ring dispensing and applying means the applicator is reciprocated in a straight line path. However, as shown in Figs. 14–18, the principles of the present invention may be incorporated into a functionally similar apparatus but whose applicator is mounted for swinging movement. In this further modified form, reference numeral 100 indicates a base on which is mounted an upright Z-shaped frame 101 (Fig. 16) carrying a swinging sector 102 mounted to swing about a horizontal pivot 103. Swinging motion is imparted the sector 102 as by means such as a pedal (or an air or hydraulic cylinder) connected to an end of a lever arm 104 which is in turn connected at its upper end to a point on the sector which is eccentric to the axis of the pivot 103 on which the sector turns. Thus, upward motion of the lever results in the sector swinging in clockwise direction, with return swinging motion being imparted thereto as by means of a spring 10 reactive between the lever arm 104 and a fixed part (not shown) of the apparatus.

Secured to the upper surface of the frame 101 is a stack rod holder 98 mounting a stack rod 99 extending through a frame opening and adapted to maintain a plurality of the retaining rings 38 in a vertical column which also extends through the frame opening. Hence, the column of rings to be dispensed is normally supported on the outer (upper) arcuate edge of the sector 102.

Figure 14:
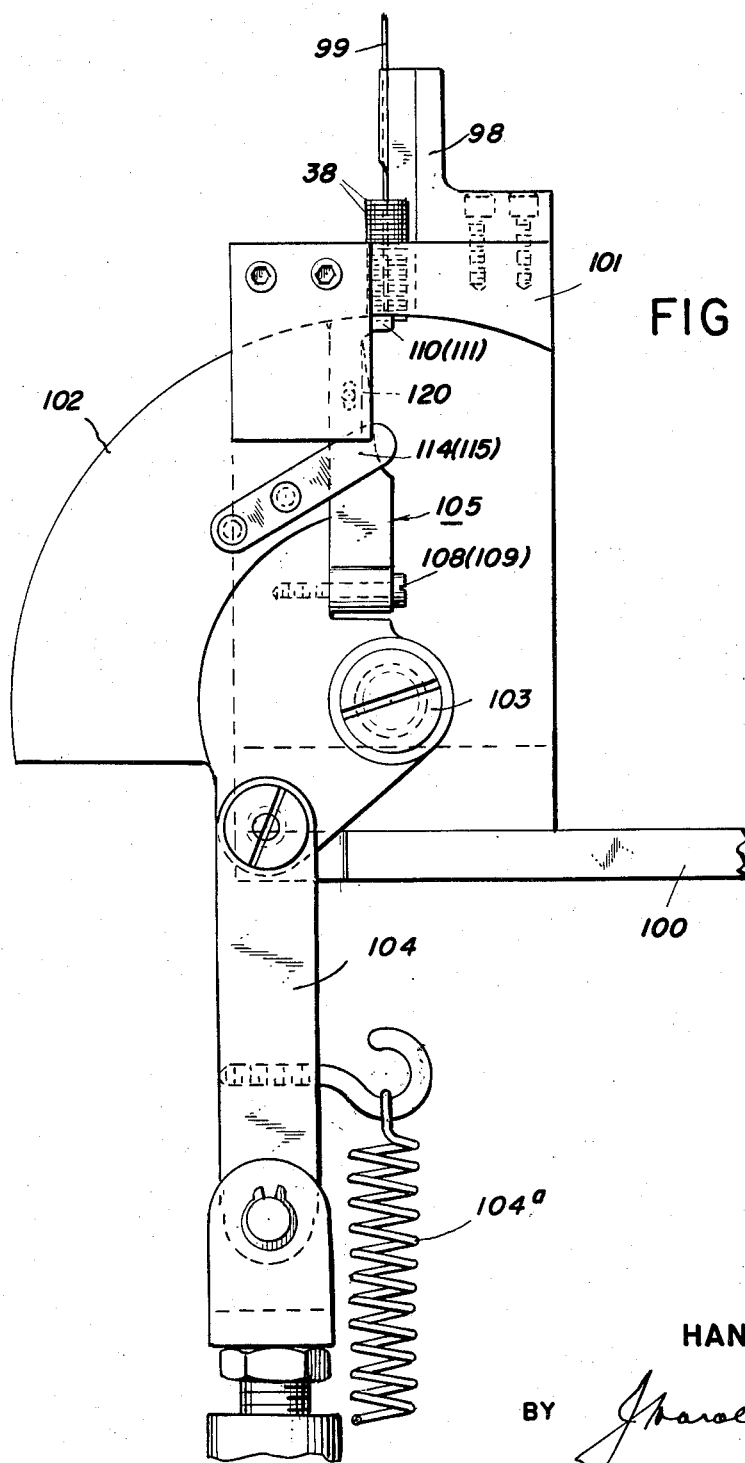
Fig. 14 is a partial side elevation of another form of retaining ring dispensing and applying means according to the invention, with the applicator being shown in its retracted position.
Figure 17:
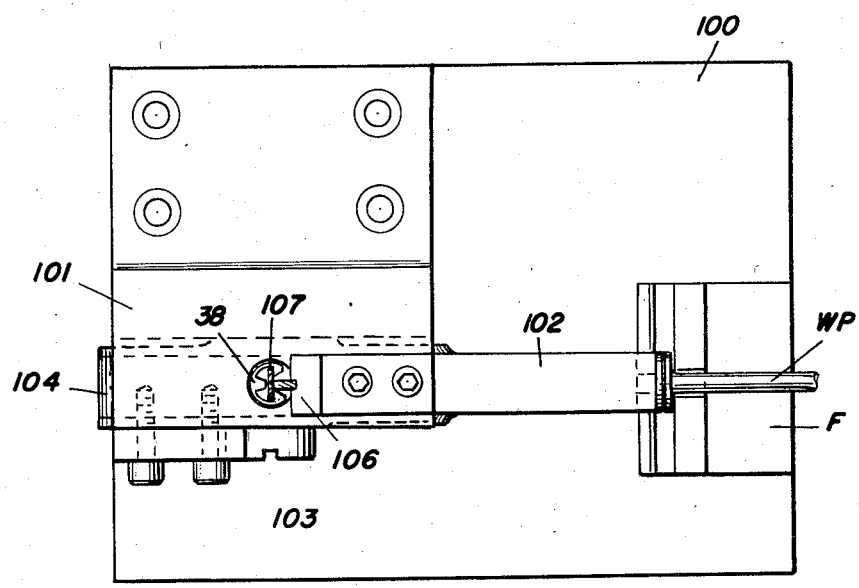
Figure 18:
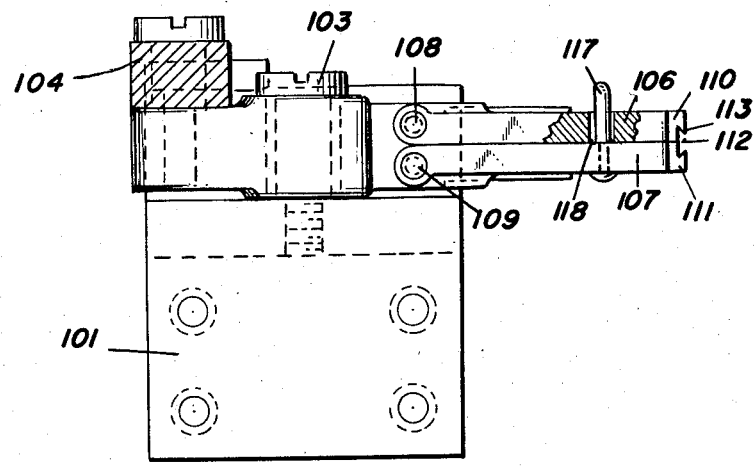

An applicator generally designated 105 includes a shank portion preferably consisting of two arms 106, 107 pivotally connected at their inner ends to the front face of the sector as by pivot pins 108, 109 (shown to be horizontally disposed in Fig. 14). The outer ends of said arms 106, 107 are angled and terminate in jaws 110, 111 having arcuate edges which together define a ring seating recess 112 and a ring backing flange 113 positioned to underlie a retaining ring seated in the recess, thereby to back it from below.

The applicator jaws 110, 111 are normally held closed by means of leaf springs 114, 115 secured at one end to the side face of the sector 102, the free ends of the springs bearing with spring pressure against the outer sides of the applicator arms 106, 107. Means are provided for spreading said applicator jaws upon the sector being swung to its retracted position (Fig. 14) in which the ring recess 112 defined by the jaws is disposed directly below the ring column. Such means illustratively comprises a transverse pin 117 which is affixed in one jaw arm and extends through a clearance hole 118 provided in the other arm. The pin has length such that its free end projects laterally from one side of the applicator 105 and its projecting end is aligned with a cam surface 120 extending into the path of the pin so as to be engaged thereby when the sector 102 is in its retracted position. When engaged by the cam surface 120, the pin is pressed laterally and spreads the applicator arms 106, 107 the limited amount required for the lowermost ring 38 of the stack thereof to drop into the ring-receiving recess 112 of the applicator, wherein it is supported from beneath by the backing flange 113. Immediately upon forward movement of the sector 102 being initiated, the applicator jaws close on the ring under the force exerted thereon by the springs 114, 115, thus to grip the ring and transfer it to the work piece. As shown in Fig. 15, the work piece WP is shown to be horizontally arranged, being supported in a fixture F supported on the base 100. Upon the applicator picking off the lowermost ring from the stack thereof, the stack lowers the distance of one ring and is supported on the arcuate outer surface of the sector 102 throughout its further forward movement and throughout its return movement as well. The advantage of the form of dispensing and applicator means characterized by a swinging member (sector) as just described over a functionally similar apparatus employing the reciprocating slide is that the former may be employed to apply retaining rings to work pieces which are horizontally supported in their fixture, whereas the reciprocating slide-type of dispensing and applying means as previously described is limited to applying rings to work pieces which are vertically supported.

Figure 19:
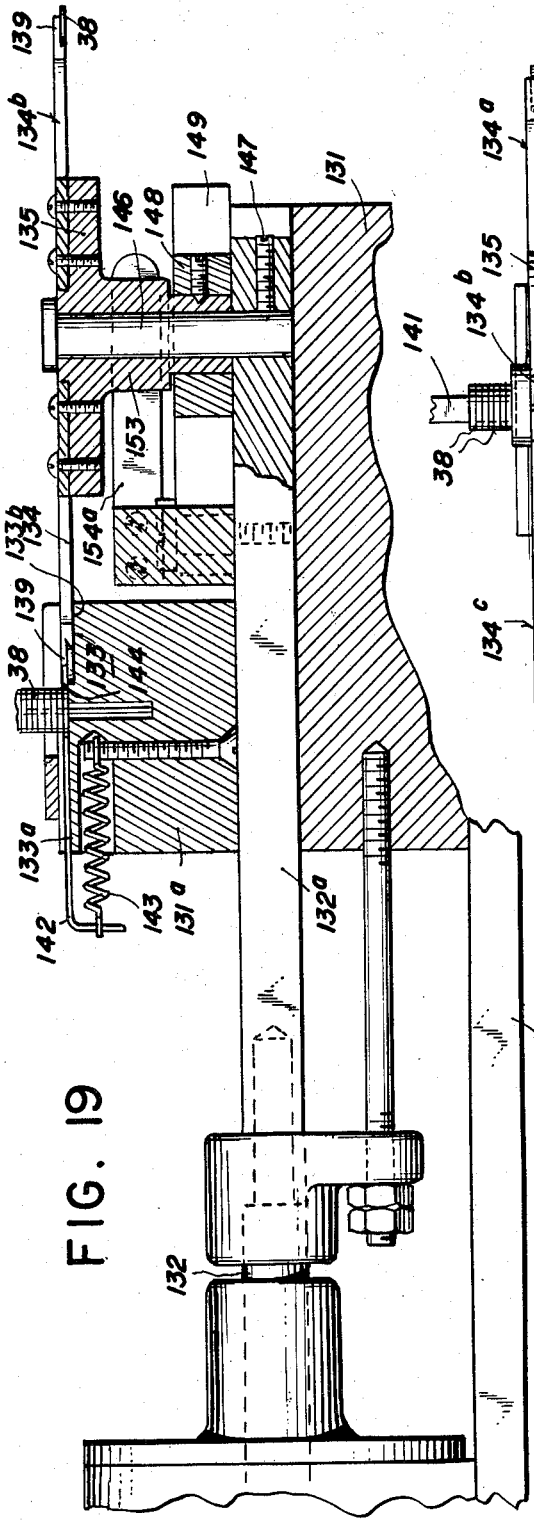
Fig. 19 is a broken-away part-sectional elevation illustrating another form of ring dispensing and applying means according to the invention, wherein the applicators are arranged in opposite pairs on a bodily reciprocable rotating head or turret, and with the turret being shown at the end of its rearward stroke.
Figure 20:
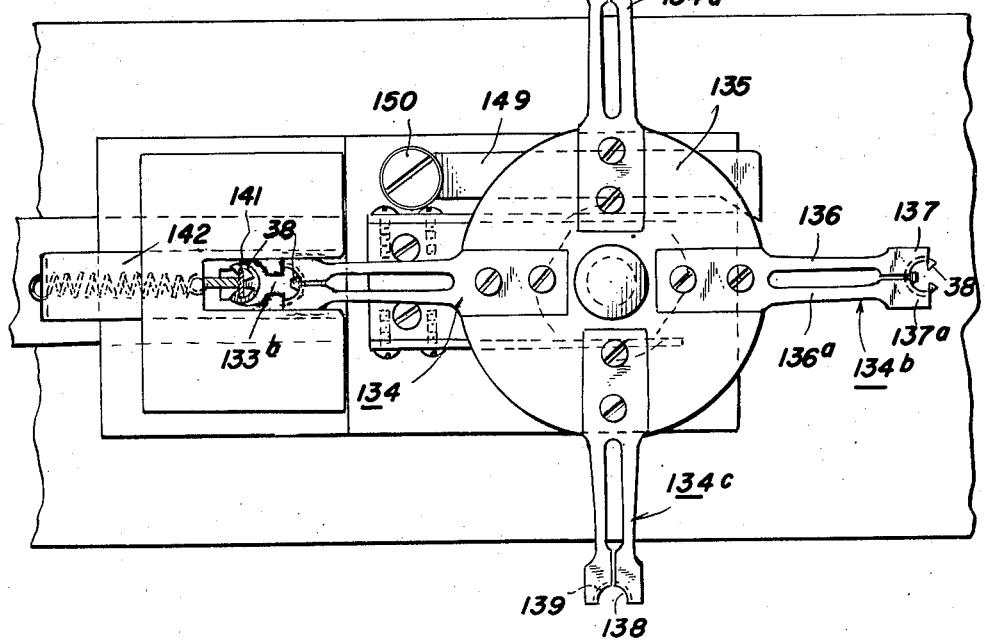
Figure 21:
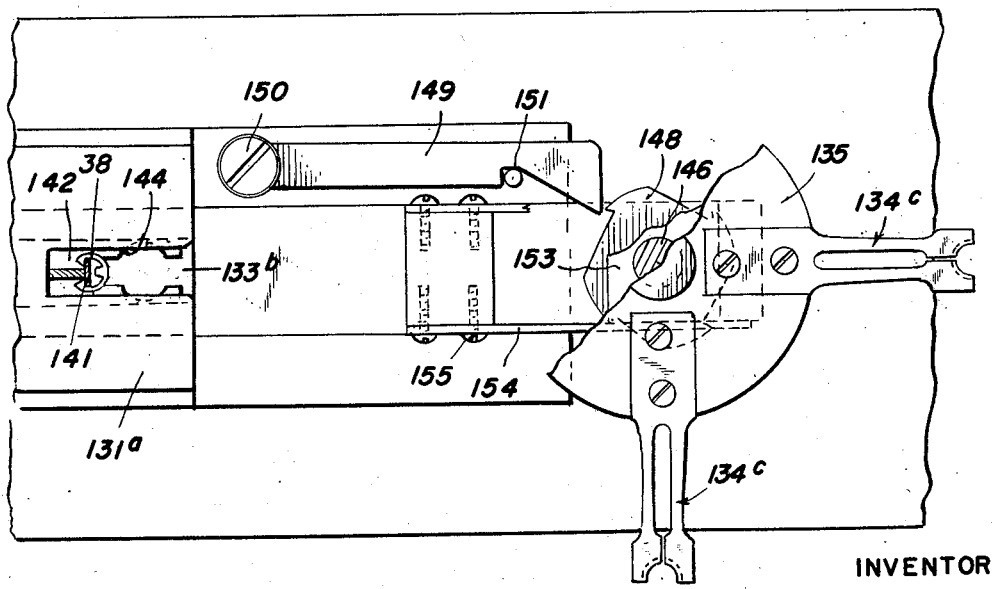

The invention also provides a ring dispensing and applying means of the reciprocating-slide type capable of further speeding up the dispensing and applying operations as compared to the previously described Figs. 1–5, 6–9 and 10–14 forms, which, it will be recalled, also incorporate the reciprocating-slide feature. Such an arrangement is illustrated in Figs. 19–22, wherein reference numeral 130 designates a base mounting a block 131 bored for the reception of a rod 132a forming a continuation of the piston rod 132. The block 131 carries a smaller upper block 131a having formed in its upper face a slideway generally designated 133 on which is adapted to slide one of a plurality of applicators designated 134, 134a, 134b, 134c. As best seen in Figs. 20 and 21, the aforesaid applicators are arranged in opposite pairs, and are preferably affixed to a rotary head member or turret 135. As will be further explained, the turret is bodily reciprocated by the rods 132, 132a, thus to effect reciprocatory travel in the slideway 133 of the particular applicator longitudinally aligned therewith. In general, each applicator is of the type previously described, comprising spreadable arms 136, 136a terminating in segmental jaws 137, 137a together defining a ring recess 138, the jaws also forming a backing flange 139 which is disposed above the ring recess.

The upper block 131a mounts a stack rod 141 on which a plurality of the retaining rings 38 to be dispensed are arranged in vertical stack formation, as heretofore. Preferably, the means by which the lowermost ring of the stack thereof is presented to the applicator and gripped thereby is the same as disclosed in my prior application Serial No. 298,869 and, for this purpose, the slideway 133 is formed with a step dividing it into two levels, the upper level portion 133a supporting a slide 142 having a normal forward position to which it is biased by a spring 143. In its normal position, the slide 142 extends well beneath the ring stack, so as to support the stack from beneath, and its forward end projects a substantial distance forwardly over the lower level portion 133b of the slideway 133. As seen in Fig. 19, the difference in elevation between the slideway portions 133a, 133b is approximately that of the axial thickness of a single retaining ring 38 so that a ring positioned on the lower level portion 133b is substantially at the same level as the applicator ring recess 138. Moreover, the slide 142 is at a level corresponding to the level of the ring backing flange 139 of the applicator, and hence is engaged by said flange as said applicator is actuated throughout its forward stroke (to the left in Figs. 19, 20 and 21).

The slide 142 is of course provided with a cut-out or slot (not shown) through which the stack rod 141 extends, thus to enable it to slide with respect to said stack rod, and at its forward end it is provided with a ring opening 144 of diameter as to receive a ring lowering thereinto from the stack, the opening being positioned lengthwise of the slide so that it registers with the ring stack when the slide has been pushed to its rearmost position by the applicator upon the latter arriving at the end of its forward (leftwise) stroke.

From the above, it will be seen that when one of the applicators 134—134c, for example the applicator 134, is aligned with the slideway 133 and is moved therealong toward the ring stack, its backing flange 139 engages and shifts slide 142 against the bias of spring 143 to a position in which the lowermost ring 38 of the stack drops through the slide opening 144 onto the higher level position 133a of the slideway 133. At the same time, the jaws 137, 137a of the applicator grip the ring deposited on the lower level portion 133b of the slideway by the preceding return travel of the slide 142, said ring abutting against the step in the slideway, or cut-outs for the ends of the ring provided therein, which holds the ring rigid so as to effect spreading of the applicator jaws thereabout. Upon the applicator 134 withdrawing from the slideway, the slide 142 is moved forwardly by the spring 143, and carries the ring just depositing in its opening 144 with it, whereupon said ring drops to the lower level portion 133b of the slideway where it is positioned to be gripped by the following applicator 134c actuated as the aforesaid applicator 134.

Reverting to the turret 135, such is bodily reciprocable by the power source acting through the piston rod 132 and its continuation rod 132a, and it is also rotatable throughout a 90° arc by said source during the early part of its return or rearward stroke. For this purpose, the turret 135 turns on a vertically disposed stub shaft 146 affixed to the rod 132a as by a set screw 147. To the upper part of the turret is affixed the shank terminals of the pairs of applicators 134—134c. The lower part of the turret carries a ratchet wheel 148 having four ratchet teeth spaced 90° apart, and which are disposed so as to ratchet in a clockwise direction only. Coacting with the ratchet wheel is a pawl 149 mounted for limited swinging movement laterally away from the ratchet wheel about a pivot 150 (Fig. 21) and for swinging movement laterally towards said ratchet wheel until stopped by a stop pin 151. Thus on a forward (rightwise) stroke of the piston rod 132, 132a, the pawl is swung laterally outwardly by the ratchet wheel, so as to ride over its ratchet teeth. However, when the stroke is reversed, one of the ratchet teeth will be engaged by the pawl 149, thereby effecting a 90° rotation of the turret and a corresponding angular movement of the applicators.

To insure alignment of the successive applicator with the slideway 133, the turret 135 is provided with a squared hub portion 153, each face thereof being exactly normal to the centerline of an associated applicator. A pair of leaf springs 154, 154a secured at one end as by screws 155, 155a to a fixed part of the turret assembly are positioned so that their free ends bear with substantial spring force against two opposite faces of the hub portions 153, thereby normally maintaining the turret in a position such that the leftwise applicator (Fig. 20) is slowly lined up with the slideway 133. The springs 154, 154a also contribute to the action of the pawl and ratchet means, as they tend to turn the turret farther once it has been turned by the pawl more than 45°.

As the turret 135 moves throughout its forward (rightwise) stroke, the functioning or leftwise applicator 132 withdraws from the slideway 133, carrying with it a gripped ring 38. Accordingly, the oppositely arranged applicator 134b is projected toward the right. This movement of the applicator corresponds to the ring applying stroke of the applicators of the previously described forms and is employed to apply a ring gripped thereby to a work piece (not shown) secured in a fixture mounted on the right end of the base 130. However, it will be understood that according to the present modification, the applicator just withdrawing from the slideway 133 is indexed throughout two 90° movements with the turret head 135 before arriving at its ring-to-work piece applying position corresponding to that of applicator 134b shown in Fig. 20.

Briefly summarizing the operation of the just described form of ring dispensing and applying means, and assuming the turret 135 to be at its most advanced (rightwise) position, the rearward stroke of the piston rod 132 results in travel of the turret to the left. The early portion of such travel results in a 90° clockwise turning of the turret to bring an applicator having the position of applicator 134c (Fig. 20) to that of applicator 134, such movement also bringing applicator having the position of applicator 134 to that of applicator 134a. Continued rearward travel of the turret then projects the applicator having the position of applicator 134 into the slideway 133, i. e. toward the stack rod. Upon the turret and said applicator arriving at the limit of their leftwise travel, said applicator grips the ring previously dropped onto the lower level portion 133b of the slideway. When the turret is now actuated throughout its forward stroke, it withdraws the gripped ring from the slideway 133.

This same movement of the turret is also employed to apply a ring gripped in the diametrically opposite applicator (corresponding to applicator 134b) to the work piece. While two cycles of operation of the turret as aforesaid are necessary to transfer the first ring from the stack to the work piece, it will be understood that following the completion of said cycles as aforesaid, the operation of the illustrated device is exceedingly fast, since thereafter a ring is always available in the applicator having a position corresponding to that of applicator 134b, for direct application to the work piece.

As many changes could be made in carrying out the above constructions without departing from the scope of the invention, it is intended that all matter contained in the above description or shown in the accompanying drawings shall be interpreted as illustrative and not in a limiting sense.

I claim:

1. Apparatus for automatically dispensing open retaining rings singly from a supply thereof and for applying said rings to work pieces positioned to receive them comprising, in combination, a support, means for maintaining a supply of open retaining rings in vertical stack formation on said support, an applicator having a ring receiving recess defined by complemental jaws spreadable under tension for resiliently gripping a ring presented to it along the ring outer edge, means operatively related to said support for positively actuating said applicator along a predetermined path of movement extending between the stack and the work piece, means operative in response to a portion of the movement of said applicator to present the lowermost ring of the stack to the gripping action of said applicator jaws, the construction and arrangement being such that, responsively to said applicator partaking of its further movement, to the work piece, it transfers the gripped ring to the work piece and finally forces it over the same so as to apply said ring to the work piece.

2. Apparatus as set forth in claim 1, wherein said last means includes means for positively spreading said jaws, thereby to facilitate entry of said lowermost ring into the applicator recess.

3. Apparatus as set forth in claim 2, wherein said jaw spreading means comprises cam means operatively related to said jaws and stationary means disposed in the path of movement of said jaws and coacting with said means to spread said jaws.

4. Apparatus as set forth in claim 1, wherein said last means includes means for spreading the applicator jaws, thereby to facilitate entry of said lowermost ring into the ring receiving recess, said jaw spreading means including ring abutment means disposed in the path of movement of the applicator for holding said ring stationary when pressed thereagainst by the applicator jaws, whereby continued movement of the applicator relative to the stationary ring effects spreading of said jaws over said ring.

5. Apparatus as set forth in claim 4, wherein said abutment means comprises spring loaded dogs disposed in the path of the applicator member, the spring loading of said dogs being such that they give way and move to an inactive position in response to further continued movement of said applicator member.

6. Apparatus as set forth in claim 1, wherein said applicator is mounted to reciprocate in a straight-line path and said actuating means imparts reciprocatory movement thereto.

7. Apparatus as set forth in claim 1, wherein said applicator is mounted to swing to and fro in an arcuate path and said actuating means imparts swinging movement to said applicator.

8. Apparatus as set forth in claim 1, wherein said applicator is carried by a bodily reciprocable rotary member mounted to reciprocate toward and away from said stack and for turning movement about an axis normal to the direction of its reciprocation.

9. Apparatus as set forth in claim 1, wherein a plurality of applicators arranged in oppositely facing pairs are provided, said applicators being carried by a bodily reciprocable rotary member mounted to reciprocate in a straight-line path toward and away from said stack and for turning movement about an axis normal to said path, and wherein said actuating means is effective to index said rotary member throughout an arc corresponding to the angle between two adjacent applicators during the first portion of the reciprocatory movement of said member towards said stack.

10. Apparatus for automatically dispensing open retaining rings singly from a stack thereof and for applying the single rings to work pieces positioned to receive them comprising, in combination, a block-like member provided in its upper face with a longitudinal slideway, means for supporting a stack of rings above the slideway, an applicator reciprocable in said slideway from a retracted to a ring applying position, and vice versa, said applicator having spreadable arms terminating in segmental ring gripping jaws together defining a substantially semi-circular ring recess for receiving a ring lowering thereinto from the stack, said arms being spaced by a slot having short-length converging edge portions, a stationary blade member extending into said slot and positioned to engage said converging edge portions thereby to spread said jaws when the applicator is in its retracted position, and means for reciprocating said applicator.

11. Apparatus for automatically dispensing open retaining rings singly from a stack thereof and for applying the single rings to work pieces positioned to receive them comprising, in combination, a block-like member provided in its upper face with a longitudinal slideway, means for supporting a stack of rings above the slideway, a slide reciprocable in said slideway, an applicator affixed to said slide for reciprocation therewith from a retracted to a ring applying position, and vice versa, and being disposed beneath the ring stack so as normally to support same, said applicator having spreadable arms terminating in segmental ring gripping jaws together defining a substantially semi-circular ring recess for receiving a ring lowering thereinto from the stack, said arms and jaws being spaced by a slot having short-length converging edge portions, a stationary blade member extending into said slot and adapted to engage said converging edge portions and thereby spread said jaws upon movement of the applicator to its retracted position in which the ring receiving recess is diposed immediately below the stack, thereby allowing the lowermost ring of the stack to drop into the ring recess, and means for reciprocating said slide and applicator.

12. Apparatus for automatically dispensing open retaining rings singly from a stack thereof and for applying the single rings to work pieces positioned to receive them comprising, in combination, a block-like member provided in its upper face with a longitudinal slideway, means for supporting a stack of rings above the slideway, a slide reciprocable in said slideway, an applicator affixed to said slide for reciprocation therewith from a retracted to a ring applying position, and vice versa, a stationary plate extending between said slide and said applicator, said applicator having spreadable arms terminating in segmental ring-gripping jaws together defining a substantially semi-circular ring gripping recess for receiving a ring dropping thereto, said arms and jaws being spaced by a slot having short-length converging edge portions, said slide being disposed above the stationary plate so as normally to support the stack and being provided with an opening positioned to receive the lowermost ring of the stack when the slide and applicator are in their retracted position, the stationary plate being provided with an opening positioned both to receive the ring contained in the slide opening and which has been advanced to said plate opening by movement of said slide to its forward position corresponding to the ring applying position of the applicator and to overlie the applicator recess when the applicator is in its retracted position, a stationary blade member extending into the applicator slot and positioned to engage said converging slot-edge portions when the applicator is in its retracted position, thereby to spread the applicator jaws and enabling the ring contained in the plate opening to drop into the ring recess of the applicator, and means for reciprocating said slide and said applicator.

13. Apparatus as set forth in claim 12, wherein the applicator jaws are formed with inward arcuate flanges together defining a backing flange for a ring received in the recess defined thereby, wherein the applicator is disposed in the slideway with its backing flange disposed upwardly, and wherein the stationary blade member projects upwardly into the slot between the applicator arms.

14. Apparatus for automatically dispensing open retaining rings singly from a stack thereof and for applying the single rings to work pieces positioned to receive them comprising, in combination, a block-like member provided in its upper face with a longitudinal slideway, means for supporting a stack of rings above the slideway, an applicator reciprocable in said slideway from a retracted to a ring applying position, and vice versa, said applicator having spreadable arms terminating in segmental ring gripping jaws together defining a substantially semi-circular ring recess for receiving a ring dropping from the stack onto the slideway, a pair of oppositely disposed spring loaded dogs mounted for outward swinging movement from a normal position in which they extend transversely across the slideway, said dogs being normally positioned forwardly of the applicator when the latter is in retracted position a distance greater than the diameter of a ring and being operative to temporarily block movement of a ring resting on the slideway under the push of the applicator when the latter begins to move forwardly on its ring-applying stroke, the spring loading of the dogs being greater than the force required to spread the applicator jaws about said ring but less than that exerted on the dogs by the ring when the latter is seated in said recess and is moving forwardly with the applicator, and means for reciprocating the applicator.

15. Apparatus for automatically dispensing open retaining rings singly from a stack thereof and applying them to a horizontally disposed work piece comprising, in combination, a frame member, a sector pivotally carried by said frame member for swinging movement about a horizontal axis towards and away from said horizontally disposed work piece, means on said frame member for maintaining a plurality of retaining rings in a stack normally supported on the outer edge surface of the sector, an applicator carried by the sector and including two arms pivoted at one end for transverse movement relative to one another and terminating at their other end in segmental jaws together defining a ring-receiving and gripping recess, spring means normally maintaining said jaws in ring gripping relation, means for spreading said jaws upon the sector moving to a position in which the applicator recess is directly beneath the ring stack, thereby permitting the lowermost ring to drop into said recess, and means for imparting swinging motion to said sector.

16. Apparatus as set forth in claim 15, wherein the means for spreading the applicator jaws comprises a pin rigidly affixed to one of said applicator arms and traversing the other arm, and cam means carried by said frame and positioned in the path of movement of said pin so as to be engaged thereby when the sector is in position such that the applicator recess underlies the ring stack.

17. Apparatus for dispensing open retaining rings singly from a stack thereof and for applying the single rings to work pieces positioned to receive them comprising, in combination, a block-like member provided in its upper face with a horizontal slideway, means for supporting a stack of rings above the slideway, a slide mounted to slide in said slideway and being operative on each cycle of forward and rearward movement to pick off the lowermost ring from the stack and advance it to a position on the slideway in which it may be gripped by an applicator, a plurality of applicators each comprising spreadable segmental arms together defining a ring receiving and gripping recess, said applicators being mounted in diametrically opposed pairs on a rotary member turnable on a vertical axis and bodily reciprocable towards and away from the ring stack, means for reciprocating said rotary member, and means responsive to movement of the rotary member throughout the first part of its rearward stroke to effect a predetermined angular rotation of said rotary member by an amount as to bring one applicator into alignment with the slideway, the construction and arrangement being such that during continued movement of the rotary member throughout its rearward stroke said one applicator moves into said slideway, actuates the slide throughout its cycle of movement and grips the ring positioned therefor by the preceding actuation of the slide, and such that on the forward stroke of the rotary member the applicator diametrically opposite said one applicator transfers a ring gripped thereby to the work piece and applies it to same.

18. Apparatus as set forth in claim 17, wherein the means for effecting predetermined angular movement of the rotary member comprises a ratchet wheel connected to said member and a stationary pawl rigid with the block-like member.

References Cited in the file of this patent

UNITED STATES PATENTS

| | | |
|---|---|---|
| 1,885,684 | Cole | Nov. 1, 1932 |
| 1,944,360 | Meyer | Jan. 23, 1934 |
| 1,966,878 | Bluzat | July 17, 1934 |
| 2,355,832 | Wagner | Aug. 15, 1944 |
| 2,473,116 | Wegman | June 14, 1949 |
| 2,483,379 | Brell | Sept. 27, 1949 |
| 2,515,487 | Bertalan | July 18, 1950 |
| 2,677,878 | Douchet | May 11, 1954 |